Figure 1:
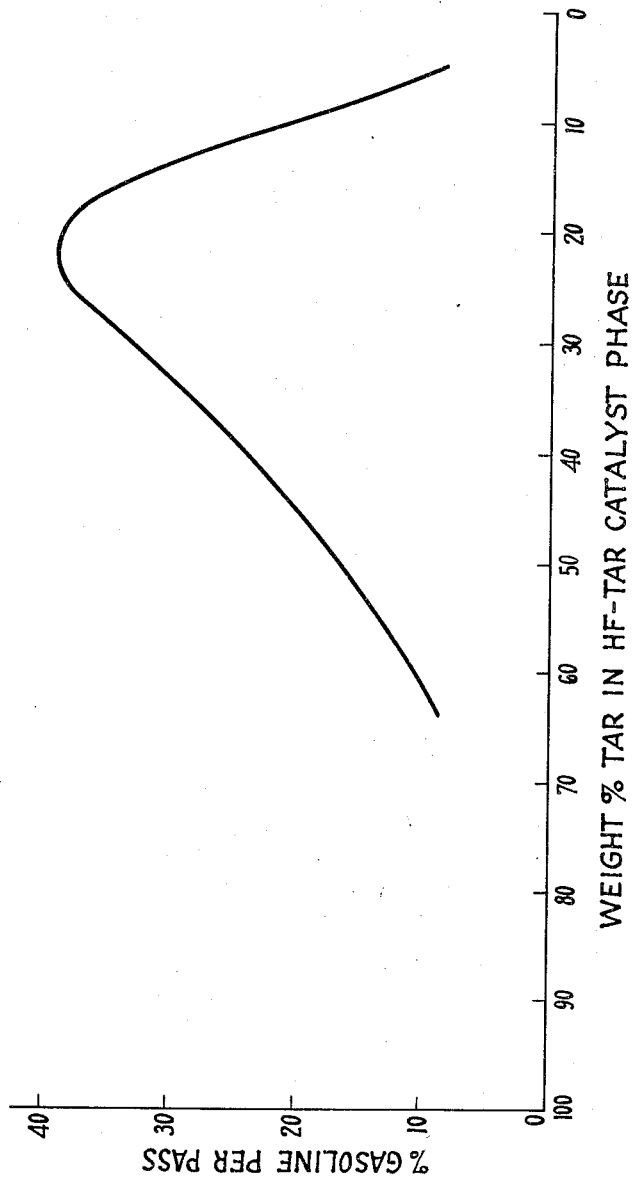

Oct. 31, 1950     H. D. RADFORD ET AL     2,527,573
CRACKING WITH HYDROGEN FLUORIDE CATALYST
Filed March 1, 1947     2 Sheets-Sheet 1

Inventors:
Herschel D. Radford
Robert J. Lee
Patrick S. Drennan
By Donald E. Payne
                Attorney

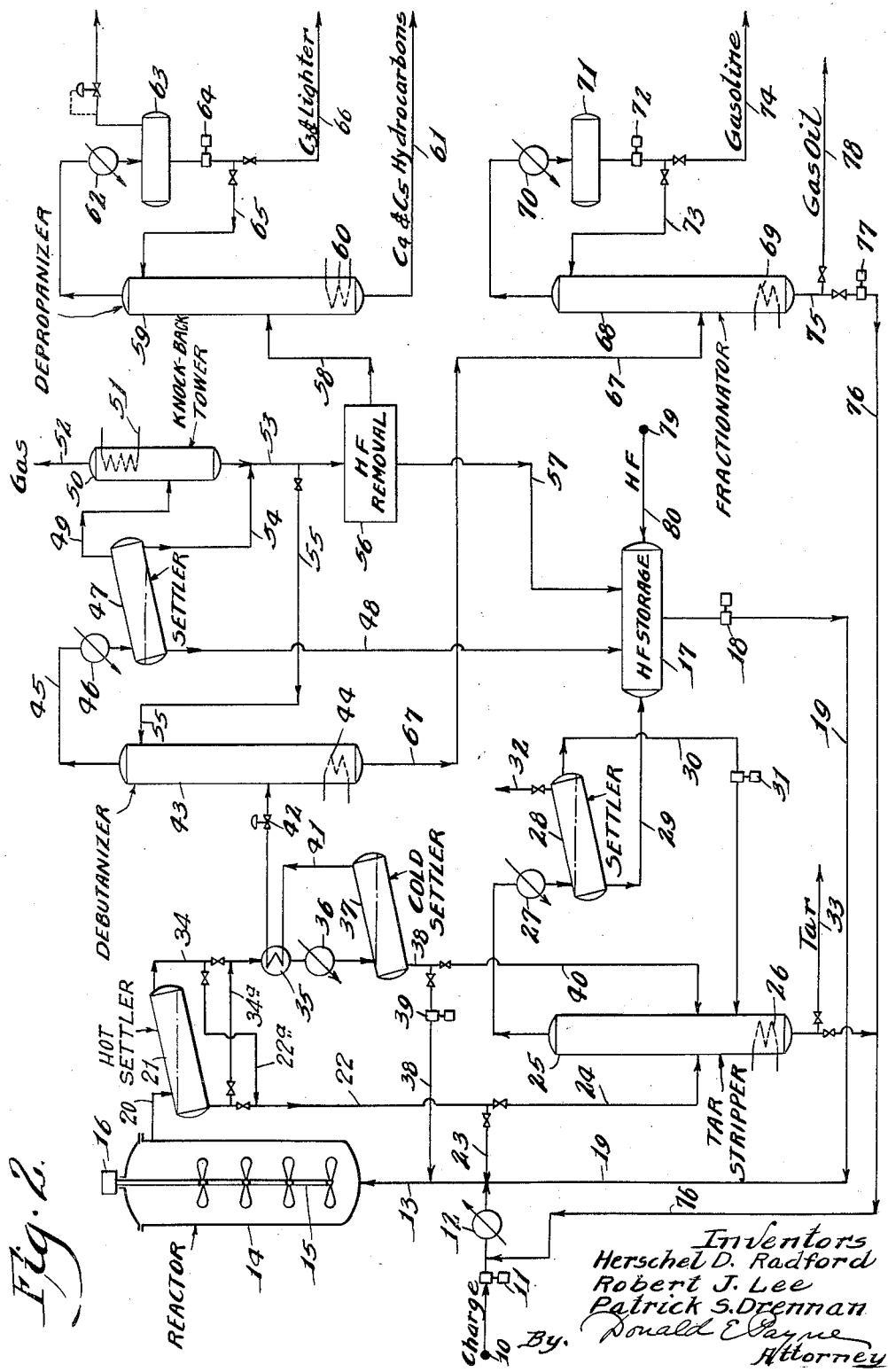

Patented Oct. 31, 1950

2,527,573

UNITED STATES PATENT OFFICE 2,527,573

CRACKING WITH HYDROGEN FLUORIDE CATALYST

Hershel D. Radford, Columbia, Mo., and Robert J. Lee, La Marque, and Pat S. Drennan, Texas City, Tex., assignors to Pan American Refining Corporation, Texas City, Tex., a corporation of Delaware Application March 1, 1947, Serial No. 731,744

7 Claims. (Cl. 196—52)

This invention relates to improvements in the cracking of hydrocarbons with hydrogen fluoride catalysts and it pertains more particularly to the cracking of heavier-than-gasoline charging stocks under optimum conditions for producing maximum yields of motor fuel in a continuous commercial cracking system.

An object of the invention is to provide a method and means for minimizing the formation of light hydrocarbon gases. Another object is to minimize the amount of tar produced and to effect maximum tar degradation, i. e. to increase the amount of gasoline at the expense of tar. A further object is to provide improved methods and means for handling hydrogen fluoride and hydrogen fluoride-containing compositions whereby a given amount of hydrogen fluoride will have maximum utility and effectiveness, hydrogen fluoride separation and recovery will be simplified, less costly and more efficient and hydrogen fluoride losses will be reduced to a minimum. In other words, the principal object of the invention is to provide a commercial hydrogen fluoride cracking system which is simple in design, economical and safe to operate, flexible with respect to charging stock and product production, and more efficient than any cracking processes heretofore known to the art. More specific objects will be apparent as a more detailed description of the process proceeds.

Briefly, the invention contemplates a system wherein the effectiveness of the hydrogen fluoride catalyst is enormously augmented and enhanced by the presence of an optimum amount of certain hydrogen fluoride-soluble hydrocarbons, preferably those which are produced in the process itself and which are commonly designated as tar. For maximum gasoline production and minimum losses to gas and tar, the hydrogen fluoride should be associated with a certain amount of said tar or equivalent material in the reaction zone. The amount is of great importance because the percent of conversion to gasoline per pass is unduly low when the tar content is too low and it is also unduly low when the tar content is too high. For cracking a 37° API gravity East Texas gas oil charging stock to form 400° F. end point gasoline the amount of tar by weight by base on total tar plus hydrogen fluoride in the reaction zone is in the range of 10% to 50%, preferably in the range of 15% to 35%, the optimum amount being about 20%. The optimum amount of tar present may vary to some extent with the composition of the charging stock and other operating conditions employed, but generally speaking they are applicable.

It is also important to maintain in the reactor or conversion zone a certain amount of oil which is insoluble in hydrogen fluoride or the hydrogen fluoride-tar solution. The term "oil" as employed herein refers to the hydrocarbon phase which is insoluble in hydrogen fluoride at ordinary temperatures as distinguished from the term "tar" which is employed to mean hydrocarbons which are soluble in hydrogen fluoride at ordinary conditions. The ratio of hydrogen fluoride to oil in the reactor or conversion zone should be at least about .5 (i. e. 0.5:1; ratios are indicated as compared to unity) and in a tower-type reactor, for example, may be as high as 10 although the optimum for a stirred or circulating emulsion-type reactor is of the order of about 1 to 4, preferably about 1 to 2. Intimacy of contact is important; such intimacy of contact is greatly enhanced by the presence of the optimum amount of tar but the reactor should be designed for effecting maximum intimacy of contact.

A feature of the invention is the use of short times of contact, preferably less than 10 minutes or in the range of about 3 to 8 minutes. With a hydrogen fluoride-to-oil weight ratio in the reactor less than 1 it may be necessary to employ a longer time to contact than 10 minutes but with a hydrogen fluoride-to-oil ratio in the reactor of about 2 or more the time of contact may be well below 10 minutes and the operation at this low contact time will produce a remarkably small amount of light hydrocarbon gas while at the same time producing a high conversion-to-gasoline per pass. Thus instead of producing about 3 to 4 weight percent of propane and 12 to 22 weight percent of butanes based on charge, the present invention results in the production of less than 1.0% of propane and less than 3 weight percent of excess butanes. An even more remarkable result is a conversion to gasoline of about 30 weight percent per pass, with approximately 40 to 50 weight percent of gas oil for recycling and only about 15 to 25 weight percent of tar.

To obtain the remarkably low gas and tar yields and high gasoline conversion per pass and maximum ultimate gasoline yields it is very important that the weight space velocity be maintained within certain limits which limits are somewhat dependent upon the temperature employed for effecting the conversion. Weight space velocity ($W_o/hr./W_c$) is defined herein as the weight of oil charged (charging stock plus recycle) per hour divided by the weight of hydrogen fluoride in the cracking zone. At about 350° F. when the hydrogen fluoride-to-oil ratio in the reactor is about 2.5 and the amount of tar based on HF plus tar is about 20%, the weight space velocity should be upwards of 0.5 but less than about 5.0, preferably about 1.0. At a cracking temperature of about 400° F. the weight space velocity may be approximately doubled or even trebled while at a cracking temperature of the order of 300° F. the weight space velocity may be about one-half to one-third of its value at 350° F. Generally speaking, for optimum operating conditions the weight space velocity should be in the range of about .5 to 10, preferably about .5 to 5, or in the vicinity of about 1 to 2. With very intimate contact, particularly at the more elevated temperatures, the HF-oil ratio may be decreased and/or weight space velocity may be increased compared with the figures given above.

The cracking should be effected in the presence of at least two liquid phases; namely, a hydrogen fluoride-insoluble phase and a hydrogen fluoride-tar phase. At temperatures of 350 to 400° F. pressures of at least 800 to 1200 p. s. i. respectively may be required, the required pressure varying somewhat with the hydrogen-fluoride concentrations as is well known to those skilled in the art. Hydrogen fluoride cracking may be effected at any temperature within the range of about 200 to 500° F. or more and the pressures may be in the range of from 500 p. s. i. (for low temperature operation) to about 3000 p. s. i., particularly when hydrogen is employed for increasing total gasoline yields. While normally at least two separate liquid phases are maintained in the reaction zone and while the catalyst phase is usually regarded as a solution of tar in liquid hydrogen fluoride, the catalyst phase may also be regarded as a tar phase which is rendered insoluble in other hydrocarbons by the presence of a large amount of hydrogen fluoride. In other words, the catalyst phase is the hydrogen fluoride-tar phase regardless of which of those components is considered as the solute and solvent respectively.

Reaction may be effected in a stirred autoclave, a packed or unpacked tower with mixing orifices, a circulating system of the type commonly employed for effecting sulfuric acid alkylation, or any other effective contacting means. Phase separation may be effected at substantially conversion temperature in a hot settler and a part of the hydrogen fluoride-tar phase may be recycled to the reactor while another part is withdrawn and the hydrogen fluoride removed therefrom for return to the reactor. The hydrocarbon-rich phase which separates in the hot settler is preferably cooled and passed to a low temperature settling zone wherein a further phase separation occurs, the lower phase in this case consisting essentially of hydrogen fluoride which is returned to the reaction zone although a part thereof may be withdrawn from the system as above described. The upper layer from the low temperature settler is then fractionated and freed from hydrogen fluoride. Fractions higher boiling than gasoline may be recycled to the conversion zone. Only a very small amount of hydrogen fluoride leaves the low temperature settler with the hydrogen fluoride-insoluble oil phase and this small amount may readily be recovered by simple stripping and azeotropic distillation and absorber means. The recycle of the separated HF-tar phase from the hot settler enormously reduces the hydrogen fluoride stripping and recovery requirements and at the same time brings about the more effective contacting of the hydrogen fluoride with the charging stock and results in the ultimate production of an ultimate tar of very high specific gravity since a considerable portion of the tar initially formed is further converted in the recycling process to hydrocarbons of the gasoline boiling range.

The invention will be more clearly understood from the following detailed description of a specific example read in conjunction with the accompanying drawings which form a part of this specification and in which Figure 1 is a chart showing the effect of the amount of tar in the catalyst phase on percent conversion per pass to 400° end-point gasoline, and Figure 2 is a schematic flow diagram of a 20,000 barrel per day hydrogen fluoride cracking plant for converting gas oil to gasoline in maximum volume yields.

The effect of the weight percent tar in the catalyst phase in the reaction zone employed for the cracking of gas oil to gasoline is illustrated, by way of example, in Figure 1 wherein such ratio is plotted against percent 400° F. end point gasoline production per pass. This figure is based on data obtained in a run in which the hydrocarbon oil gas was continuously introduced into the bottom of a tower-type reactor filled with HF and packed with carbon Raschig rings. The effluent was cooled and passed to a settler, from which the settled HF catalyst phase was recycled through a preheating coil at a relatively rapid rate to the inlet of the reactor. No fresh HF was charged to the unit at any time. As the run progressed, samples of the hydrocarbon product continuously removed from the settler were analyzed for gasoline content, with small samples of the HF catalyst phase being taken for analysis of the tar content.

With no tar added or recycled, there will inevitably be some undeterminable amount of tar present in the reactor which is formed while the cracking reaction proceeds. This initially formed tar differs considerably from the ultimate tar produced in tar recycle operations and it contains a large amount of material boiling within the charging stock boiling range. When the catalyst or tar phase is recycled the tar becomes further degraded with the resultant production of additional gasoline and at the same time the effectiveness of the catalyst is apparently enhanced because the tar appears to bring about a more intimate and effective contact between the hydrogen fluoride and the oil which is undergoing cracking. Experimental data has indicated that the general effect of increasing the amount of tar from about 10% to 20% is to increase conversion per pass to 400° F. end point gasoline. As the amount of tar is increased from about 25% or 30% the conversion per pass rapidly declines. For optimum conversion per pass the amount of tar should be about 15 to 35%, preferably about 20 to 25% based on total catalyst phase (HF plus tar).

An initial tar (stripped HF soluble product) produced in a once-through operation may have a gravity as high as 15 to 25° API., an asphaltene content of only about .4 to 4%, an iodine number in the range of 100 to 200, and a molecular weight of only about 225. Tars having these properties enhance the cracking reaction and are preferably recycled in the process. The ultimate stripped tar may have a gravity of approximately 0° API or lower, i. e. a density well above 1.0. An ultimate tar produced by hydrogen fluoride cracking, and removed at the end of the run on which Figure 1 is based, was found to have for example a density of 1.12, a ring and ball softening point of 145° F., a penetration of 0 at 32° F., 60 seconds and 200 grams, a penetration of 153 at 115° F., 5 seconds and 50 grams, a ductility of more than 150 at 77° F. with 5 cms. per minute, an open cup flash point of 340° F., solubility in carbon tetrachloride 100 weight percent, solubility in heptane 67.5 weight percent, solubility in acetone 82.3 weight percent, iodine number 140, fluorine content 0.05 weight percent, carbon content about 92 weight percent, molecular weight about 425. An ultimate tar having these properties is representative of that produced under conditions of decreasing activity as shown on the extreme left portion of Figure 1, and should be removed from the process.

For maximum ultimate gasoline production it is essential to use a relatively high weight space velocity which means a relatively short contact time. With very low weight space velocities corresponding to a contact time of about 4 hours there is an enormous production of light hydrocarbon gas and excess butanes (i. e. butanes in excess of that required for 10 pound Reid vapor pressure gasoline). An increase in weight space velocity in the range below about 1 was found to produce an enormous decrease in the amount of light hydrocarbon gas and excess butanes produced, the production of dry gas being reduced over 6 fold and the production of butane being reduced upwards of 5 fold. A most unusual feature of increasing weight space velocity in this range was the fact that conversion of gas oil to gasoline remained at a high level with increase in space velocity, in at least one case actually increasing the yield per pass of gasoline. Generally speaking, the weight space velocity should be of the order of about 1 to 2 at a temperature of about 350° F. At lower temperatures the space velocity will be correspondingly lower and at higher temperatures they will be correspondingly higher. With the optimum hydrogen fluoride: oil ratio and the optimum amount of tar present the contact time is preferably less than 10 minutes—e. g. in the range of about 3 to 8 minutes.

Figure 2 illustrates a specific example of the invention as applied to the cracking of 37° API. East Texas gas oil in a continuous commercial hydrogen fluoride cracking plant. It should be understood that the invention is equally applicable to the cracking of other gas oils and in fact any hydrocarbon charging stock which is higher boiling than gasoline provided, however, that when a reduced crude or tar-containing charge is employed the tar component thereof (i. e. the component soluble in hydrogen fluoride at room temperatures) should be considered as tar rather than oil in the defined relationships.

The charging stock from source 10, if not free from moisture, should first be dried by passage through a bauxite dryer or other conventional drying means (not shown) and it is then passed by pump 11 through preheater 12 and line 13 to reactor 14 at a pressure of about 900 to 1500 p. s. i. The reactor and other elements should of course be fabricated from or lined with metals, alloys or components which are resistant to hydrogen fluoride corrosion, such materials (e. g. monel alloy) being known to those skilled in the art. The reactor should be designed to withstand the necessary high pressures and should be provided with means for obtaining intimate contact between two liquid phases. If a tower-type reactor is employed the intimate mixture may be obtained by the use of mixing and distributing nozzles, the charge in this case being introduced at the top because of the low density of the HF at conversion temperature. The reactor may be equipped with agitating means such as stirrer 15 driven by motor 16 the shaft being packed with a polyfluoroethylene packing composition. The reactor may consist of a tank provided with a pump-circulated emulsion stream such as employed for example in conventional sulfuric acid alkylation operations. Two or more reactors may of course be employed in series or in parallel and the reactor should be designed to provide for a weight space velocity of approximately 1.0, an amount of tar in the catalyst phase in the reactor of about 20% and a ratio of hydrogen fluoride: oil about 2. The HF: oil: tar ratio is thus 4:2:1 in this example. It should be understood that the hydrogen fluoride: oil ratio and the amount of tar may vary within a limited range as hereinabove set forth and the ratios and other conditions set forth in this example are by way of illustration.

In starting up the operation about 3 parts by weight of hydrogen fluoride from storage tank 17 is introduced by pump 18 and lines 19 and 13 for each part by weight of charging stock introduced. During normal operation after equilibrium conditions have been attained only about .5 part by weight of make-up hydrogen fluoride is required per part by weight of charging stock (including recycle gas oil) since about 1.5 parts by weight of hydrogen fluoride are recycled with about .5 part by weight of tar. The important consideration is the maintenance of the desired hydrogen fluoride: oil ratio and the right amount of tar in the reaction zone itself regardless of the ratio of hydrogen fluoride: oil introduced from hydrogen fluoride source 17 and oil source 10 respectively.

The heat for effecting the reaction may be attained by preheating incoming charging stock (including any recycle oil) in preheater 12 and such preheating should be sufficient to maintain reactor 14 at a temperature of about 375° F. The operating pressure is sufficient to maintain two liquid phases within the reactor; namely, an oil phase and a hydrogen fluoride-tar phase which two phases should be intimately admixed with each other for obtaining maximum conversion. The tar present in the hydrogen fluoride-tar phase enormously facilitates the desired intimacy of contact and increases the effectiveness of the catalyst. The actual time of contact of the incoming oil charging stock in the reaction chamber is preferably less than 10 minutes and may be of the order of about 2 to 9 minutes, e. g. about 8 minutes. The mixed liquid phases are withdrawn from the upper part of the reactor (either up-flow or down-flow may be used) through line 20 to hot settler 21. In this settler the hydrogen fluoride-tar solution separates as an upper or lower layer depending upon the temperature and the nature and quantity of dissolved tar. At 300 to 350° F. and with about 20 to 25% of heavy tar in said solution it is usually heavier than the oil layer and is returned by gravity flow or by a pump (not shown) through lines 22, 23, and 13 to reactor 14. At high reaction temperatures a cooler (not shown) may be employed in line 20 to cool the effluent stream to such temperature, e. g. about 300° F. as to effect separation of said solution as a lower layer, or it may be withdrawn as an upper layer by using cross-over line 22a.

During the starting up procedure all of the hydrogen fluoride and tar may thus be recycled in order to build up the desired amount of tar in the catalyst phase, the amount of hydrogen fluoride introduced from tank 17 being correspondingly decreased at this time. During normal operation, however, after equilibrium has been reached, a portion of the withdrawn hydrogen fluoride-tar layer from line 22 is introduced through line 24 to tar stripper 25 which is provided with a suitable reboiler 26 at its base. Hydrogen fluoride is effectively distilled and stripped from the tar in tower 25, the overhead from this tower being condensed in cooler 27 and collected in receiver 28 which may act as a separator. The condensed hydrogen fluoride is removed from the bottom of the settler through line 29 to storage tank 17 and an upper liquid hydrocarbon layer is recycled through line 30 by pump 31 to serve as a stripping agent in tower 25. Any excessive accumulations or deficiencies of hydrocarbon upper layer in settler 28 may be corrected by the introduction or removal of hydrocarbons through line 32 as will be hereinafter described. The tar stripper may be operated with a bottom temperature of about 500–600° F., a top temperature of approximately 150° F. and at a pressure of approximately 45 p. s. i. (all pressures referred to being gauge pressures). The final tar product is withdrawn from the base of the stripper through line 33 with a fluoride content of only about .05% or less so that in most cases no further defluorination is required and this tar may be utilized in any known manner. By varying the operating conditions in stripper 25, the fluoride content of the final tar product can be varied over a considerable range depending on the desired end-use for this product. Any dissolved gas oil and unsaturated cracked products of the gas oil boiling range may be separated from the heavy tar components by a simple distillation and returned to the reactor or utilized per se.

The hydrogen fluoride insoluble material from hot settler 21 passes by line 34 (or by cross-over line 34a if it separates as a lower layer) through heat exchanger 35 and cooler 36 to cold settler 37 in which the operating temperature may be that obtainable by ordinary cooling water, e. g. about 50° to 200° F. At this temperature a considerable quantity of hydrogen fluoride separates out as an insoluble lower layer including some dissolved tar and HF soluble products and this settled hydrogen fluoride material is preferably returned by lines 38 and 13 to reactor 14, pump 39 being employed when the arrangement and design of the apparatus so requires. Alternatively either all or a portion of the hydrogen fluoride material from the cold settler may be introduced through line 40 to tar stripper 25 although ordinarily no portion of this stream is sent to the stripper.

The upper layer from cold settler 37 consists almost entirely of a hydrogen fluoride insoluble oil which contains only about .01 to .02% dissolved hydrogen fluoride. This oil is passed by line 41 through heat exchanger 35 and thence through pressure reducing valve 42 to tower 43 which is provided with a suitable reboiler or heating means 44 at its base. Substantially all of the dissolved hydrogen fluoride is driven overhead from tower 43 along with some of the pentanes and substantially all of the butanes and lighter hydrocarbons through line 45 and condenser 46 to separator 47. Additional hydrogen fluoride thus concentrated in the overhead separates from condensed hydrocarbons in settler 47 and may be withdrawn through line 48 to hydrogen fluoride storage 17. Any uncondensed gases in the top of settler 47 may pass through line 49, through a small tower 50 provided with a knockback cooler 51, the $H_2S$ and other uncondensed gases being vented through line 52 while the condensate is returned by line 53 to join the hydrocarbon layer withdrawn from settler 47 through line 54. A portion of this hydrocarbon condensate may be returned by line 55 to serve as reflux in tower 43. The remainder passes through hydrogen fluoride removal system 56, the removed hydrogen fluoride being returned by line 57 to storage tank 17 and the hydrocarbon being introduced by line 58 to depropanizer 59 which is provided with a suitable reboiler or heater 60 at its base. The $C_4$ (and $C_5$) hydrocarbons are withdrawn from the base of depropanizer through line 61 while propane is taken overhead through condenser 62 to receiver 63, a portion being returned by pump 64 and line 65 for reflux and the net production being withdrawn through line 66.

The hydrogen fluoride removal system 56 may be of any conventional type. The liquid may be contacted with bauxite in defluorinating cases of the type commonly used in hydrogen fluoride alkylation systems. It may be absorbed in organic or inorganic liquids and subsequently recovered from said liquids by stripping. It may even be neutralized or chemically combined with organic or inorganic materials and thus removed from the system. No invention is claimed in the particular removal means employed but it should be pointed out that only an extremely small amount of hydrogen fluoride will require removal at this point since substantially all of the hydrogen fluoride is recovered from various streams by simple stripping, azeotropic distillation and settling.

Any net accumulation of hydrocarbons from settler 28 may be introduced from line 32 to column 43. Any deficiency of hydrocarbons in settler 28 may be supplied by introducing condensed hydrocarbons from line 55 (or line 61) through line 32 into settler 28 or through line 30 to tar stripper 25.

The partially depentanized and substantially hydrogen fluoride-free liquid product from the base of tower 43 passes through line 67 to fractionator 68 which is provided with suitable reboiler or heating means 69 at its base. 400° F. end point gasoline is taken overhead through condenser 70 to receiver 71 part of it being recycled by pump 72 and line 73 to serve as reflux in the fractionator and the net gasoline production being withdrawn from the system through line 74. The gas oil fraction leaves the base of tower 68 through line 75 and it may be recycled through line 76 by pump 77 or withdrawn from the system through line 78 to be converted elsewhere or utilized in any known manner.

By operating in the manner hereinabove set forth the total production of light hydrocarbon gases is extremely small and the $C_4$–$C_5$ stream from line 61 may simply be blended with a gasoline stream from line 74 to give the final motor fuel gasoline. A 10 pound Reid vapor pressure gasoline thus produced may have approximately the following composition:

Paraffins:
| | | |
|---|---|---|
| Isobutane | 4.1 | |
| Normal butane | .6 | |
| Isopentane | 9.7 | |
| Normal pentane | .8 | |
| $C_6$ and heavier paraffins | 39.3 | |
| | | 54.5 |

Naphthenes:
| | | |
|---|---|---|
| Cyclohexane | 1.0 | |
| Methyl cyclohexane | 7.6 | |
| Di-methyl cyclohexane | 11.0 | |
| Tri-methyl cyclohexane | 5.8 | |
| Tetramethyl and methyl ethyl cyclohexanes | 3.8 | |
| Higher boiling naphthenes | 9.4 | |
| | | 38.6 |

Aromatics:
| | | |
|---|---|---|
| Benzene | 0.3 | |
| Toluene | 0.2 | |
| Xylenes | 1.0 | |
| Higher boiling aromatics | 5.4 | |
| | | 6.9 |

Although this gasoline has a clear ASTM octane number of only about 70, it is remarkably responsive to lead tetraethyl (due in part perhaps to the complete removal of sulfur) so that only 1 cc. of tetraethyl lead is required to bring its octane rating up to about 80. It is characterized by a remarkably high branched-chain paraffin content particularly in the low boiling fraction and is an excellent blending stock for highly olefinic gasolines from other known processes when it is desired to market an olefin-containing motor fuel with exceptionally high road octane number or octane number as determined by the research method. The quality of the gasoline and extent of conversion of course is somewhat dependent on the charging stock as well as on operating conditions. High reaction temperatures favor increased octane numbers, a paraffinic gas oil of 36.4° API gravity giving a gasoline of about 70 octane number at 350° F. cracking temperature and about 73 octane number at 400° F. cracking temperature. A 31.0° API naphthenic gas oil when cracked at 400° F. with HF catalyst has given a gasoline with an octane number upwards of 75.

From the above description it will be seen that the recovery of hydrogen-fluoride from various effluent components is achieved in a simple and inexpensive manner so that hydrogen fluoride losses may be almost negligible and the traces of hydrogen fluoride in the various streams are so small that ordinarily no defluorination of them is required. The amount of make-up hydrogen fluoride is therefore very small, such make-up being introduced from source 79 by line 80. The final hydrogen fluoride removal from light hydrocarbons may be effected after depropanizer 59 instead of after tower 43 by simply introducing uncondensed gases as well as hydrocarbon liquids from settler 47 to depropanizer 59. For the most part hydrogen fluoride is effectively separated in simple settlers 21, 28, 37 and 47 the last three of these operating at relatively low temperature and therefore giving quite complete separation.

In hot settler 21 a considerable amount of the hydrogen fluoride and also some tar may be included in the oil layer so that the use of cold settler 37 is of great practical importance. Under certain operating conditions and particularly at high temperatures and low tar content the oil layer is heavier than the hydrogen fluoride-tar layer in hot settler 21 but under most conditions in the optimum tar range the hydrogen fluoride-tar layer is at the bottom.

A cold settler corresponding to settler 37 may also be employed in line 22 and in such an additional cold settler a hydrogen fluoride insoluble oil layer may separate from the hydrogen fluoride-tar bottom layer. Where it is desired to recover this particular oil fraction on account of its relatively high boiling and olefinic character it may separately be removed and passed through a stripper similar to tar stripper 25 a part of the bottom layer from such cold settler being returned to reactor 14 and the remainder being passed to tar stripper 25. Where the ultimate object is to produce 400° end point gasoline it is usually unnecessary to employ a cold settler in line 22 since the required cooling and subsequent heating are not justified by any advantages of cold separation.

In towers 25 and 43 the complete removal of hydrogen fluoride is attained not only by virtue of the high temperatures at the base of these towers but also by virtue of the ascending vapors which effectively strip out hydrogen fluoride. In tar stripper 25 this stripping effect of ascending vapors is augmented by the circulation of relatively light hydrocarbon vapors preferably of the $C_3$–$C_5$ range via line 30 and pump 31.

The recycle of tar along with hydrogen fluoride from hot settler 21 via lines 22, 23 and 13 not only promotes the cracking of oil in reactor 14 but increases the ultimate gasoline yield by becoming itself further degraded. In some cases extraneous tar or heavy olefinic stock from some outside source may be introduced to the system at a point preceding preheater 12 or directly to line 13. The cracking process may thus serve the double function of producing gasoline from extraneously introduced tar while converting a gas oil charging stock to gasoline. The use of extraneously introduced tar also facilitates starting up procedure and this expedient may be employed for holding the hydrogen fluoride-tar ratio in the reactor within the defined limits as the run proceeds. By effecting conversion in the presence of added hydrogen the tar may be even further utilized for gasoline production so that gasoline yields may be further enhanced.

While hydrogen fluoride has been described as the catalyst it should be understood that the hydrogen fluoride may be promoted by boron fluoride or other promoters known to the art and/or that the conversion may be effected in the presence of a small amount of water. Instead of directly recycling the hydrogen fluoride-tar via line 23 to reactor 14 the entire stream from line 22 (and/or from line 38) may be introduced into the tower stripper 25 and tar from line 33 along with hydrogen fluoride from storage chamber 17 may be returned to the reaction zone in amounts required for the process. Various other modifications and alternative procedures and operating conditions will be apparent from the above description to those skilled in the art.

In copending application for Letters Patent, Serial No. 718,817, filed by John A. Ridgway, Jr., and Philip Hill on December 27, 1946, there is claimed a process for cracking heavier-than-gasoline hydrocarbons in the presence of liquid hydrogen fluoride and tarry products substantially in excess of the amount produced in once-through conversion of said hydrocarbons.

We claim:
1. A conversion process which comprises con- tacting a hydrocarbon oil higher boiling than gasoline with hydrogen fluoride in the presence of tar in a conversion zone under conditions for effecting substantial conversion of the higher boiling oil into gasoline boiling range hydrocarbons, continuously introducing a mixture of hydrogen fluoride-tar and oil from said conversion zone to a hot separating zone maintained at substantially conversion temperature and pressure, continuously withdrawing oil from said hot separating zone to a cold separating zone for removing hydrogen fluoride therefrom, returning hydrogen fluoride from the cold separating zone to the conversion zone, separately withdrawing oil from said cold separating zone and fractionating said oil, withdrawing hydrogen fluoride and tar from said hot separating zone as a stream which is separate from the oil withdrawn therefrom, recycling a part of said stream to said conversion zone and stripping hydrogen fluoride from another part of said stream.

2. The method of claim 1 which includes the step of returning the major part of said stream to said conversion zone and introducing only a minor part of said stream to said stripping zone.

3. The method of claim 1 which includes the further steps of fractionating oil removed from the cold separating zone while simultaneously stripping hydrogen fluoride therefrom and concentrating said hydrogen fluoride in an overhead stream from said fractionation, cooling said overhead stream to effect separation of a hydrogen fluoride layer from a hydrocarbon layer and returning said hydrogen fluoride to said conversion zone.

4. A hydrogen fluoride-hydrocarbon conversion system which comprises a reactor, a hot settler, a cold settler, a hydrogen fluoride storage tank and a plurality of distillation columns each provided with a condenser and condensate receiver, means for introducing a charging stock from an outside source and hydrogen fluoride from said storage tank to said reactor, means for obtaining intimate contact between the hydrogen fluoride and said charging stock in said reactor, means for discharging liquids from said reactor to said hot settler, a cooler, means for withdrawing an oil stream from said hot settler to said cold settler through said cooler, means for returning hydrogen fluoride and tar from said hot settler to said reactor and from said hot settler to one of said distillation columns, means for returning hydrogen fluoride from said cold settler to said reactor, means for introducing oil from said cold settler to another of said distillation columns, means for returning hydrogen fluoride from the receiver associated with each distillation column to said hydrogen fluoride storage tank and means for recovering from the base of each distillation column a product fraction which is substantially free from hydrogen fluoride.

5. The method of cracking a gas oil charging stock with hydrogen fluoride which method comprises preheating said charging stock to at least conversion temperature, introducing said preheated charging stock and also hydrogen fluoride and tar into a conversion zone, maintaining in said conversion zone a temperature in the range of about 300 to 450° F. and a pressure sufficient to maintain a liquid oil phase and also a liquid hydrogen fluoride phase in said zone, maintaining in said conversion zone a weight ratio of hydrogen fluoride: tar in the range of about 2 to about 8, maintaining in said conversion zone a weight ratio of hydrogen fluoride: oil within the range of about 1 to about 4, employing a weight space velocity in said conversion zone in the range of about .5 to about 5, intimately contacting a liquid oil phase with a separate hydrogen fluoride: tar phase in said conversion zone and discharging mixed liquids from said conversion zone to a hot settling zone, separating a hydrogen fluoride-tar phase from a hydrogen fluoride-oil phase in said settling zone, introducing at least a part of the settled hydrogen fluoride-tar from said hot settling zone to a tar stripping zone, removing hydrogen fluoride from tar in said stripping zone and returning said removed hydrogen fluoride to said conversion zone, withdrawing separated oil from said hot settling zone, cooling said withdrawn oil and introducing the cooled oil into a cold settling zone, removing hydrogen fluoride from said cold settling zone and returning it to said conversion zone and fractionating oil removed from said cold settling zone.

6. The method of claim 5 which includes the step of recycling at least a part of the hydrogen fluoride and tar from the hot settling zone directly back to said conversion zone.

7. A hydrogen fluoride-hydrocarbon conversion process which comprises contacting a hydrocarbon with a sufficient amount of hydrogen fluoride in a reaction zone at sufficiently high temperature and sufficiently long contact time to form a light hydrocarbon product substantially insoluble in hydrogen fluoride and a heavy product which is soluble in hydrogen fluoride, introducing both product fractions and hydrogen fluoride from said reaction zone into a first separating zone maintained at high temperature and pressure, separating in said first separating zone light hydrocarbon product containing dissolved hydrogen fluoride from heavy product dissolved in a first hydrogen fluoride phase, withdrawing and cooling the separated light hydrocarbon product to cause formation of a second hydrogen fluoride phase, separating said second hydrogen fluoride phase from the light hydrocarbon product in a second low temperature separating zone, subsequently removing residual hydrogen fluoride from the light hydrocarbon product, withdrawing from the first named separating zone a stream of heavy product dissolved in the first hydrogen fluoride phase, removing hydrogen fluoride from at least a part of said stream, and returning at least a part of the hydrogen fluoride from at least one of said separation steps to said reaction zone.

HERSHEL D. RADFORD.
ROBERT J. LEE.
PAT S. DRENNAN.

REFERENCES CITED

The following references are of record in the file of this patent:

UNITED STATES PATENTS

| Number | Name | Date |
|---|---|---|
| 2,357,495 | Bloch | Sept. 5, 1944 |
| 2,378,762 | Frey | June 19, 1945 |
| 2,405,993 | Burk | Aug. 20, 1946 |
| 2,416,184 | Lee et al. | Feb. 18, 1947 |
| 2,448,015 | Burk | Aug. 31, 1948 |
| 2,454,615 | Ridgway et al. | Nov. 23, 1948 |